(12) United States Patent
Nair (10) Patent No.: US 7,979,067 B2
(45) Date of Patent: Jul. 12, 2011

(54) CONTEXT AVATAR

(75) Inventor: Rahul Nair, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 792 days.

(21) Appl. No.: 11/707,789

(22) Filed: Feb. 15, 2007

(65) Prior Publication Data

US 2008/0201638 A1    Aug. 21, 2008

(51) Int. Cl.
*H04W 4/00* (2009.01)
(52) U.S. Cl. ............... 455/432.3; 455/414.2; 455/404.2; 455/566
(58) Field of Classification Search ............... 455/432.3, 455/414.2, 404.2, 456.3, 566
See application file for complete search history.

(56) References Cited

U.S. PATENT DOCUMENTS

| | | | | |
|---|---|---|---|---|
| 5,880,731 | A | 3/1999 | Liles et al. | 345/349 |
| 6,344,794 | B1 * | 2/2002 | Ulrich et al. | 340/539.16 |
| 2007/0101247 | A1 * | 5/2007 | Matsuki et al. | 715/500 |
| 2008/0136895 | A1 * | 6/2008 | Mareachen | 348/14.03 |
| 2008/0195954 | A1 * | 8/2008 | Dharmarajan et al. | 715/749 |

FOREIGN PATENT DOCUMENTS

KR    10-2005-0079852 A    11/2005

OTHER PUBLICATIONS

Jed et al., "Towards rich context virtual worlds", Jul. 5-8, 2005, vol. 133, Proceedings of Workshops on Cooperative Systems and Context, and Groupware and Context, France.
Padmanabhan et al., "An Investigation of Geographic Mapping Techniques for Internet Hosts", SIGCOMM '01, Aug. 27-31, 2001, San Diego, CA.

* cited by examiner

*Primary Examiner* — Nghi Ly
(74) *Attorney, Agent, or Firm* — Martine Penilla & Gencarella, LLP (57) ABSTRACT

Methods and systems for generating information about a physical context of a user are provided. These methods and systems provide the capability to render a context avatar associated with the user as a composite image that can be broadcast in virtual environments to provide information about the physical context of the user. The composite image can be automatically updated without user intervention to include, among other things, a virtual person image of the user and a background image defined by encoded image data associated with the current geographic location of the user.

27 Claims, 10 Drawing Sheets

CONTEXT AVATAR

BACKGROUND

1. Field of the Invention

The invention relates generally to providing information about a context of a user and, more particularly, to a smart image-based personification of a user that displays information about the user's context without requiring user interaction.

2. Description of the Related Art

An avatar is an Internet user's representation of the user commonly in the form of a two-dimensional icon that can be used in Internet forums and other virtual communities. For example, today Internet user's can use avatars to communicate their activities, location, or mood to other users. However, to do so, users must update their avatar to display their current activity, location, or mood, each time there is a change in the user's context. Users often forget or do not have time to perform these updates.

In view of the forgoing, there is a need to automatically update an avatar based on user context in a manner that guarantees that a user's avatar is an accurate representation of the user's current status.

SUMMARY

In one embodiment, the present invention provides a method for generating information about a physical context of a user. The method comprises obtaining the information about the physical context of the user. The method further comprises rendering a composite image including a virtual person image of the user, where the composite image provides an encoded representation of the information about the physical context of the user. Obtaining information about the physical context of the user and rendering the composite image are performed without intervention by the user.

In another embodiment, the present invention provides a computer-readable media for directing a computer system to generate information about a physical context of the user. The computer-readable media comprises instructions for obtaining the information about the physical context of the user. The computer-readable media further comprises instructions for rendering a composite image including a virtual person image of the user, where the composite image provides an encoded representation of the information about the physical context of the user. Obtaining information about the physical context of the user and rendering the composite image are performed without intervention by the user.

In yet another embodiment, the present invention provides a system for generating information about a physical context of a user. The system comprises a mobile device coupled to the Internet. The mobile device is capable of providing location information of the mobile device and user identifier information associated with the mobile device on the Internet. The system further comprises a processing server coupled to the Internet. The processing server is capable of obtaining information about the physical context of the user from the Internet, including the location information of the mobile device and the user identifier information. The location information and the user identifier information can be used by the processing server to determine a geographic location of the user. The processing server is also capable of generating a composite image including a virtual person image of the user. The composite image provides an encoded representation of the information about the physical context of the user, including the geographic location of the user.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Embodiments of the present invention provide systems and methods for generating information about a context of a user. More particularly, according to embodiments of present invention, a "context avatar" that communicates current information about the physical context of the user can be automatically generated and published in a virtual environment. Such virtual environments can include a webpage, an Internet forum, a virtual community, or any other virtual environment. This approach allows user's to constantly update their context avatar without requiring any explicit user action, including accessing the Internet.

According to embodiments of the present invention, the "context avatar" can be presented as a composite image that can include a virtual person image of the user (or "avatar"). The composite image can also include encoded image data that communicates other information about the user's physical context. For example, the encoded image data can include, but is not limited to, information about the current geographic location of the user, the current weather conditions at the geographic location of the user, the current time at the geographic location of the user, the current activity of the user, geographically relevant news information, or any other information that is relevant to the user or the user's current physical context. Moreover, by using encoded image data rather than providing explicit information about the user's physical context, a viewer of a user's context avatar will need to have some level of shared context with the user before the information contained in the context avatar can be decoded.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. The present invention includes several aspects and is presented below and discussed in connection with the Figures and embodiments.

Figure 1A:
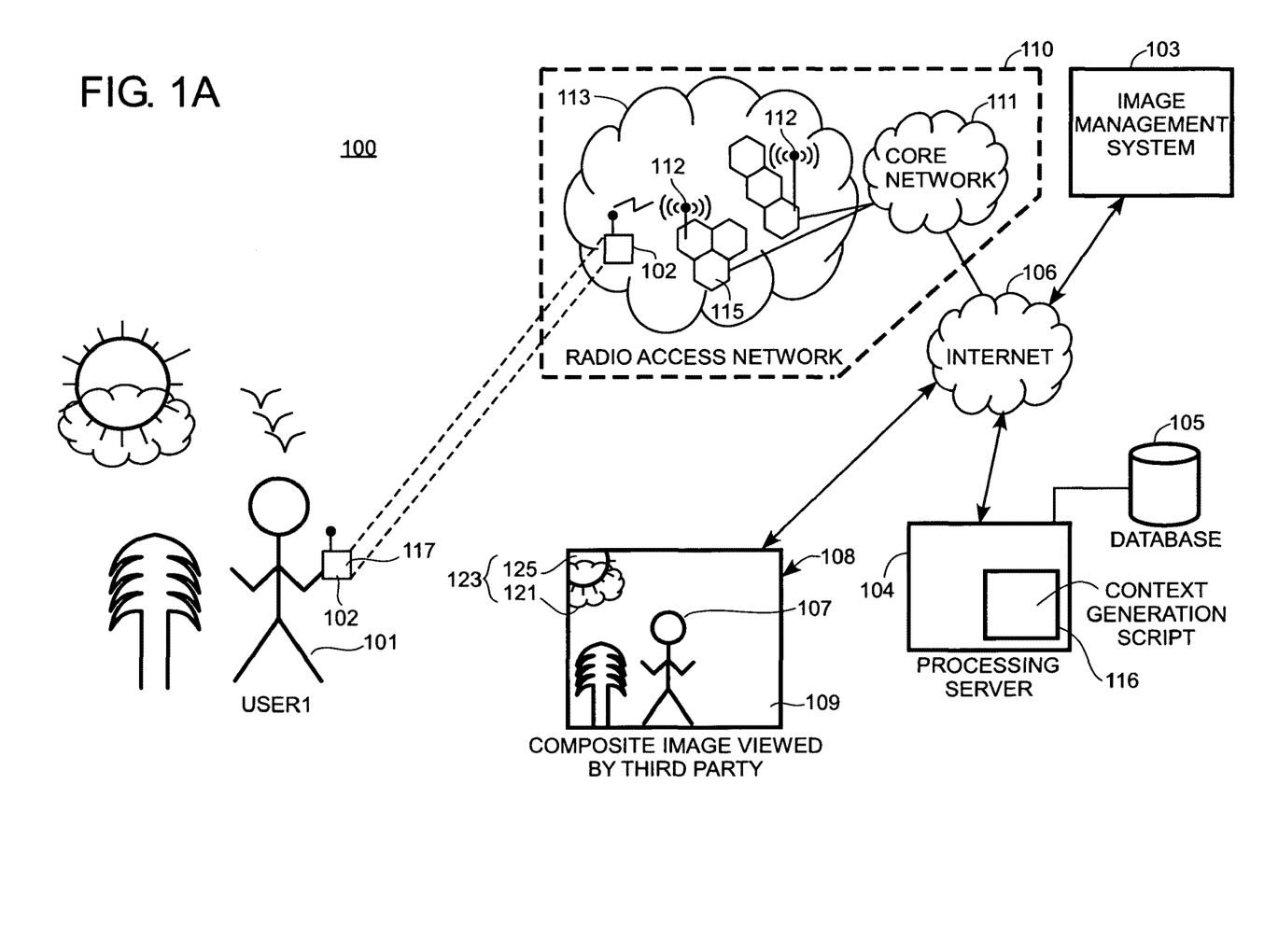
FIG. 1A is an illustration of a system for generating information about a physical context of a user, in accordance with an embodiment of the present invention.

In FIG. 1A, according to an embodiment of the present invention, is an illustration of a system 100 for generating information about a physical context of a user 101. The system 100 includes a mobile device 102, a cellular communication system 110 coupled to the Internet 106, and a processing server 104 coupled to the Internet 106. In the embodiment shown in FIG. 1A, the mobile device 102 is a cellular phone. However, according to embodiments of the present invention, the mobile device 102 can be any mobile device capable of being serviced by the cellular communication system 110.

Figure 3A:
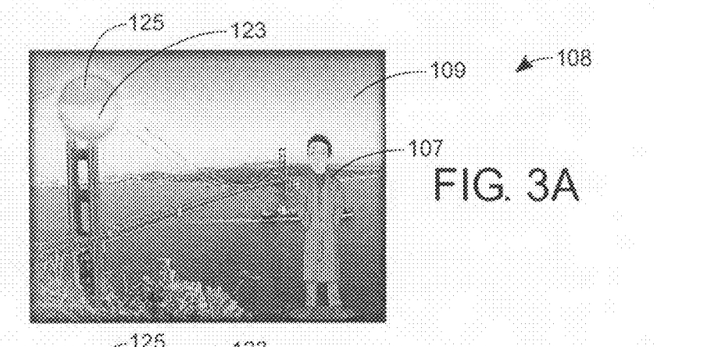
FIG. 3A is an illustration of a composite image including a background image that includes encoded image data associated with a geographic location of a user, in accordance with an embodiment of the present invention.
Figure 3B:
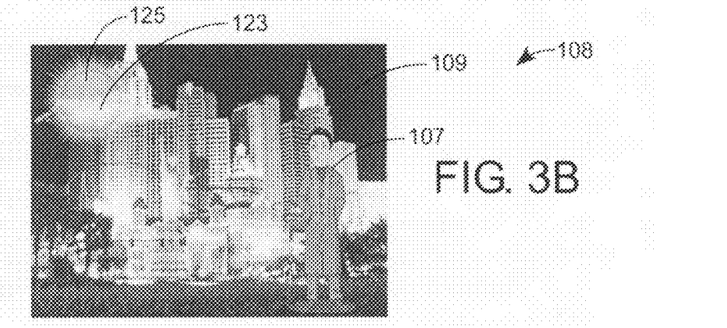
FIG. 3B is an illustration of a composite image including a background image that includes encoded image data associated with a geographic location of a user, in accordance with an embodiment of the present invention.

In one embodiment of the present invention, the processing server 104 is configured to create the context avatar of the user 101 by invoking a context generation script 116 that resides on the processing server 104. The context avatar of the user 101 can be presented in the form of a composite image 108. The composite image 108 can include, among other things, a virtual person image 107 of the user 101 and a background image 109 defined by encoded image data associated with the current geographic location of the user 101. For example, FIGS. 3A and 3B each illustrate a composite image 108 including a virtual person image 107 and a corresponding background image 109 illustrating the user 101 located in San Francisco and Las Vegas respectively. According to one embodiment of the present invention, the processing server 104 can invoke the creation of the composite image 108 by obtaining information associated with the geographic location of the user 101. In one embodiment of the present invention, the processing server 104 does this by obtaining location information of the mobile device 102 that is associated with the user 101. In particular, the location information of the mobile device 102 is retrieved by the processing server 104 from the mobile device 102 via the cellular communications system 110 and the Internet 106.

The cellular communication system 110, according to one embodiment of the present invention, can be any cellular communications system that is capable of determining the location information of the mobile device 102. For example, conventional mobile cellular communication systems like the cellular communication system 110 shown in FIG. 1A are typically divided into two segments: (1) a core network 111 that performs switching functions and interfaces to external networks such as the Internet 106 or public-switched telephone networks (PSTNs); and (2) a radio access network 113 that performs air-interface related functions between the mobile device 102 and a cellular phone tower 112. In the cellular communication system 110, each cellular phone tower 112 is associated with a geographic coverage area 115 (i.e. a "cell") and a cellular tower ID.

As the user 101 travels from cell 115 to cell 115, the user's mobile device communication is handed off between cells 115 from one cellular phone tower 112 to another. A client module 117 installed on the user's mobile device 102 can retrieve the location information of the mobile device 102 from the cellular phone tower 112 to which the mobile device 102 is currently communicating. For example, the client module 117 can be a ZoneTag™ client module 117 or any other module 117 capable of retrieving location information from the cellular phone tower 112. In one embodiment of the present invention, the location information includes the cellular tower ID of the cellular phone tower 112 to which the mobile device 102 is currently communicating. Once the client module 117 retrieves the location information, the client module 117 uploads the location information and user identifier information associated with the mobile device 102 to the core network 111. In turn, the core network 111 provides this location information and user identifier information on the Internet 106 in any manner well known to those of ordinary skill in the art.

In one embodiment of the present invention, the processing server 104 retrieves the location information and user identifier information from the Internet 106 and passes the information to the context generation script 116. The context generation script 116 is configured to render the composite image 108 that forms the user's context avatar, as illustrated in FIGS. 3-6. The context generation script 116 can determine a geographic location of the user 101 by converting the cellular tower ID passed to it from the processing server 104 into a corresponding city, state, or zip code. For example, a Yahoo!™ ZoneTag™ Location Application Program Interface (API) can be used by the context generation script 116 to convert the cellular tower ID into a city, state, or zip code etc. that defines the geographic location of the user 101. However, it is important to note that any API, algorithm, etc. can be used to perform the conversion.

In one embodiment of the present invention, the context generation script 116 can also be configured to obtain the encoded image data that defines the background image 109 of the composite image 108. The encoded image data can be obtained by the context generation script 116 from an image database 105 coupled to the processing server 104 or accessible to the processing server 104 via the Internet 106, as discussed in more detail below in FIG. 2D. The context generation script 116 can also obtain the encoded image data by downloading the encoded image data from an image management system 103 via the Internet 106, as discussed in more detail below regarding FIG. 2D. According to one embodiment of the present invention, the image management system 103 can be any system including but not limited to such online systems as Flickr™. In this case, the image data can be geographically tagged and provided to the image management system 103 by the user 101 from the mobile device 102 using such applications as ZoneTag™, as discussed in more detail below regarding FIG. 2D.

According to one embodiment of the present invention, the composite image 108 that forms the user's context avatar can also include information about the weather conditions and/or time of day information at the current geographic location of the user 101. Therefore, the context generation script 116 is configured to automatically obtain weather information and/or time of day information corresponding to the geographic location of the user 101. For example, the context generation script 116 can obtain weather information for the user's current geographic location using the Yahoo!™ Weather RSS 2.0 (Really Simple Syndication) API, or any other interface known to one of ordinary skill that provides up-to-date weather information for a particular geographic location. Likewise, the context generation script 116 can obtain time of day information at the geographic location of the user 101 in any manner well known to one of ordinary skill in the art. Information about the current weather conditions and the time of day information at the geographic location of the user 101 can be included in the background image 109 of the composite image 108 in the form of an icon image 121. Specifically, according to one embodiment, the icon image 121 can include an image 125 representing the current time of day at the geographic location of the user 101 and/or an image 123 representing the current weather conditions at the geographic location of the user 101, as illustrated in FIGS. 3-6.

According to one embodiment of the present invention, the context avatar of the user 101 represented by the composite image 108 can be broadcast within any virtual environment. For example, in one embodiment of the present invention, the processing server 104 can publish the composite image 108 to a webpage via the Internet 106. Once the composite image 108 is broadcast in a virtual environment, viewers interested in obtaining information about the user 101 can view the composite image 108 and obtain information about the physical context of the user 101 by decoding the images used to form the composite image 108. As discussed in detail below regarding FIG. 2A, according to one embodiment of the present invention, the processing server 104 can be configured to periodically perform the creation and publication of the composite image 108 without intervention by the user 101.

Figure 1B:
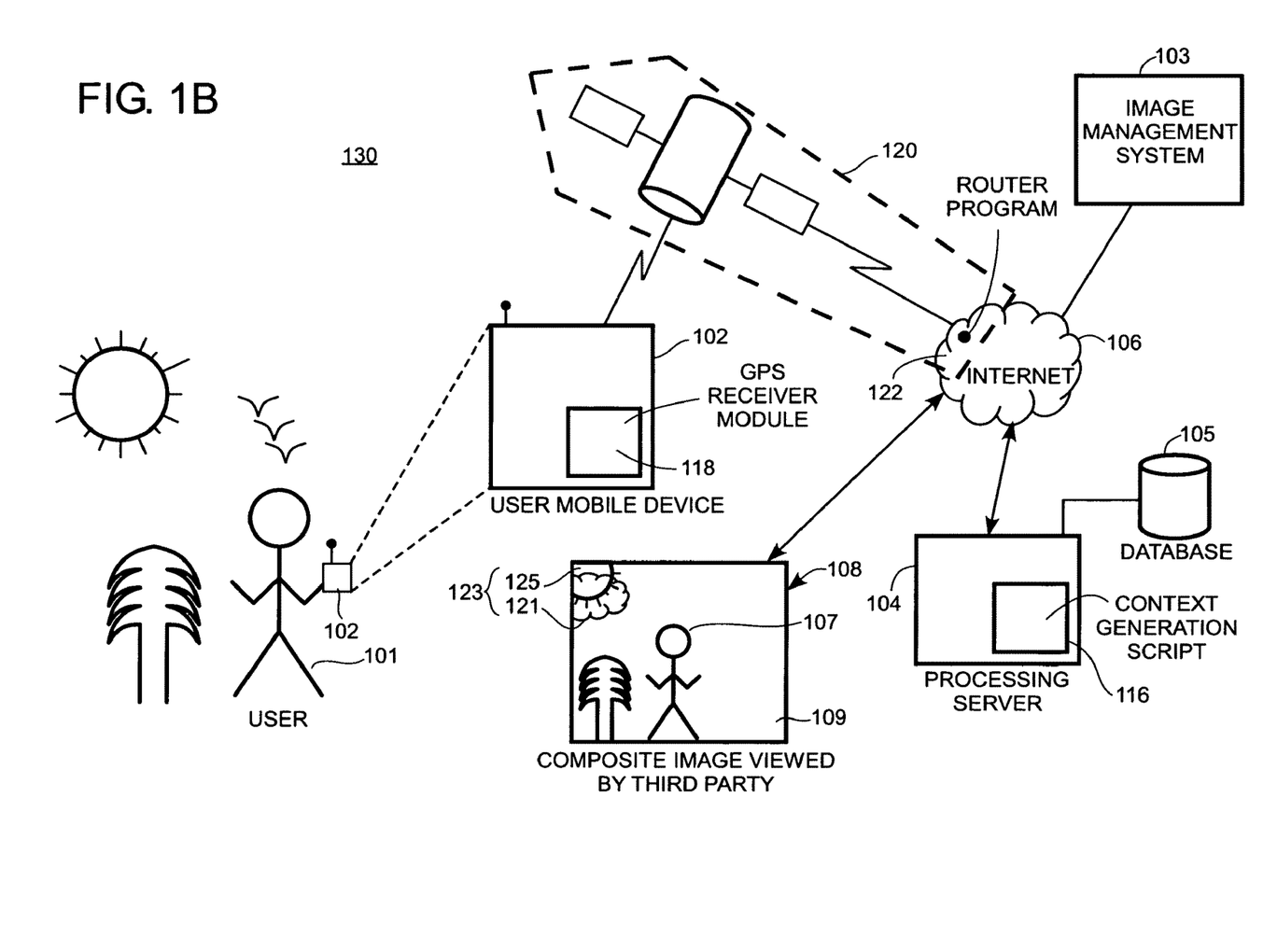
FIG. 1B is an illustration of an alternate system for generating information about a physical context of a user, in accordance with an embodiment of the present invention.

In FIG. 1B is an illustration of an alternative system 130 for generating information about a physical context of the user 101, according to one embodiment of the present invention. Similar to the system 100 shown in FIG. 1A, the system 130 includes a mobile device 102 and a processing server 104 coupled to the Internet 106. However, in FIG. 1B, the mobile device 102 is a Global Positioning System (GPS)-capable device that includes a GPS receiver 118 and the cellular communication system 110 of FIG. 1A is replaced by a satellite communication system 120.

The satellite communication system 120, according to embodiments of the present invention, can be any conventional satellite communication system, including but not limited to a GPS, that is capable of obtaining the location information of the mobile device 102 and providing the location information to the GPS receiver 118 of the mobile device 102 in any manner well known to those of ordinary skill. In one embodiment of the present invention, the GPS receiver 118 can then transmit the location information and user identifier information associated with the mobile device 102 to the Internet 106 via the satellite communication system 120 or by any other method well known to those of ordinary skill. In one embodiment of the present invention, the location information is retrieved by the processing server 104 from the satellite communication system 120 via the Internet 106 can include latitude and longitude GPS coordinates. For additional information regarding the functionality of GPS and other satellite communication systems, reference can be made to: T. S. Logsdon and C. W. Helms, *Computer Simulation and the Performance Capabilities of the Navstar Space-Based Navigation System*, Proceedings of the 13th Conference on Winter Simulation—Volume 1 (Atlanta, Ga., Dec. 9-11, 1981), IEEE Press, Piscataway, N.J., 247-257; P. H. Dana, *Global Positioning System (GPS) Time Disseminating for Real-Time Applications*, Real-Time Syst. 12, 1 (January 1997).

Similar to the processing server 104 discussed above in FIG. 1A, the processing server 104 shown in FIG. 1B is configured to retrieve the location information of the mobile device 102 and user identifier information from the Internet 106 and pass the information to the context generation script 116. In one embodiment of the present invention, the context generation script 116 utilizes the GPS latitude and longitude coordinates included in the location information to determine the city, state, or zip code associated with the geographic location of the user 101. As described above regarding FIG.

1A, the context generation script 116 can render a context avatar for the user 101 in the form of a composite image 108, as illustrated in FIGS. 3-6. The processing server 104 can then broadcast the composite image 108 to virtual environments via the Internet 106 to provide one or more viewers with encoded information about the physical context of the user 101. As discussed above regarding FIG. 1A, the composite image 108 can include, but is not limited to, a virtual person image 107 of the user, and image data representing the user's geographic location, weather conditions and/or time day information at the user's geographic location, geographically relevant news information, the user's activities, etc.

Figure 1C:
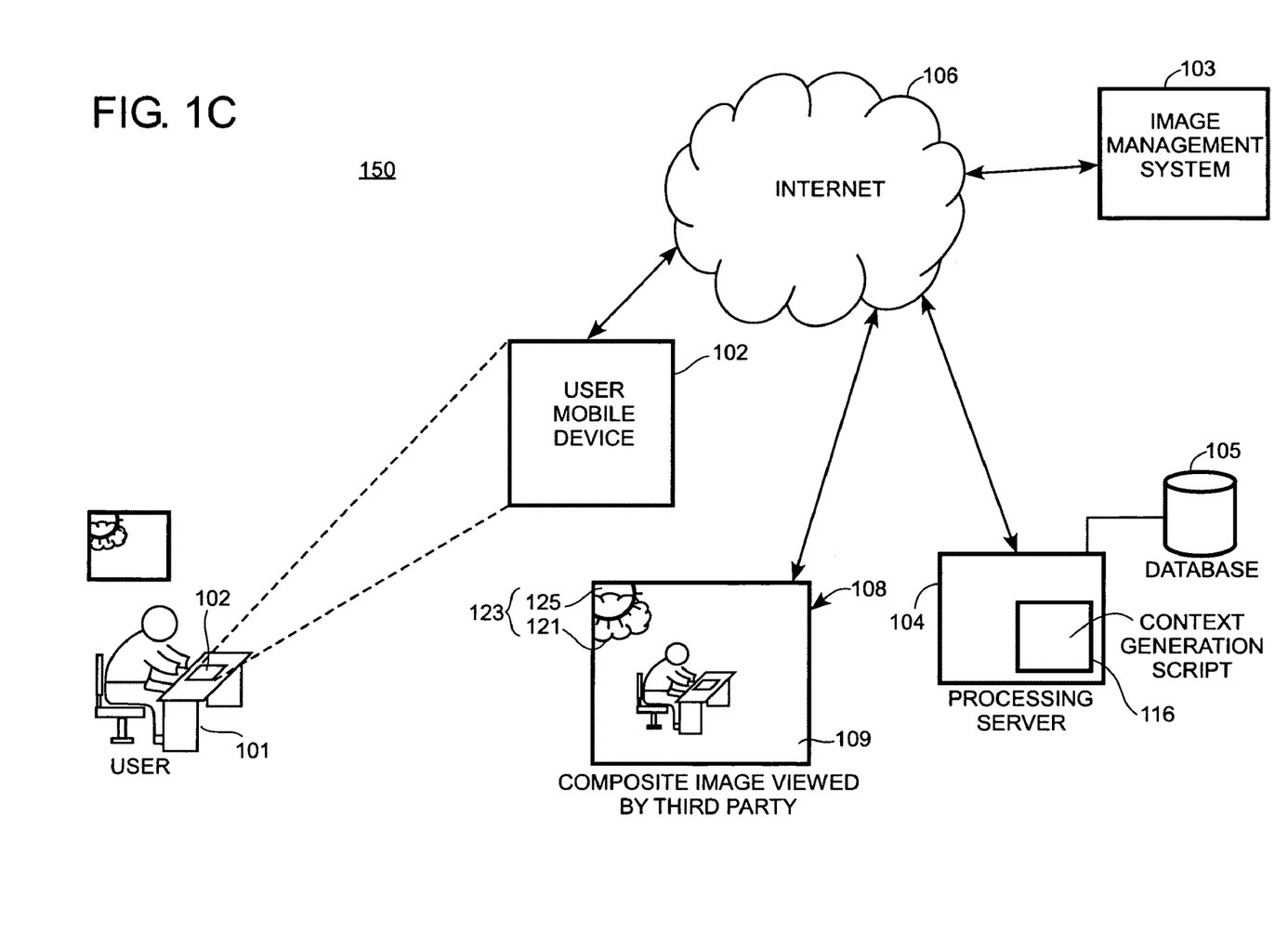
FIG. 1C is an illustration of an alternate system for generating information about a physical context of a user, in accordance with an embodiment of the present invention.

In FIG. 1C is an illustration of an alternative system 150 for generating information about a physical context of a user 101, according to one embodiment of the present invention. Similar to the system 100 shown in FIG. 1A, the system 150 includes a mobile device 102 and a processing server 104 coupled to the Internet 106. However, in FIG. 1C, according to one embodiment of the present invention, the mobile device 102 is a computing device such as a laptop computer, a PDA, etc. that is coupled to the Internet 106. In one embodiment of the present invention, the computing device 102 sends location information to the Internet 106 that can include an Internet Protocol (IP) address or a WiFi (Wireless Fidelity) BSSID (Basic Service Set ID) associated with the computing device 102, and provides unique user identifier information identifying the user 101 associated with the computing device 102.

Similar to the processing server 104 discussed above in FIG. 1A, the processing server 104 shown in FIG. 1C is configured to retrieve the location information of the computing device 102 and the user identifier information from the Internet 106 and pass the location information and user identifier information to the context generation script 116. In one embodiment of the present invention, the context generation script 116 utilizes the IP address or the WiFi BSSID included in the location information to determine the city, state, or zip code associated with the geographic location of the user 101. One skilled in the art will recognize that there are several methods for converting an IP address or WiFi BSSID into a geographic location. For additional information regarding the conversion of an IP address into a geographic location, reference can be made to: Quova™ (http//:www.quova.com/) which provides utilities for performing IP address to geographic location lookups; Venkata N. Padmanabhan, *An Investigation of Geographic Mapping Techniques for Internet Hosts*, Proceedings of ACM SIGCOMM 2001, San Diego, Calif. (August 2001); Venkata N. Padmanabhan, *Determining the Geographic Location of Internet Hosts*, Extended Abstract in Proceedings of ACM SIGMETRICS 2001, Boston, Mass. (June 2001). As recognized by those of ordinary skill, methods for converting a WiFi BSSID into a geographic location are primarily, but not necessarily, based on the fact that each WiFi router/access point has a unique ID (BSSID) that the WiFi router/access point sends to the computing device 102. For additional information regarding the conversion of a WiFi BSSID into a geographic location, reference can be made to: A. LaMarca et al., *Place Lab: Device Positioning Using Radio Beacons in the Wild*, In Proceedings of Pervasive, pp. 116-133 (2005).

Based on location information and other information obtained by the context generation script 116, as described above regarding FIG. 1A, the context generation script 116 can render a context avatar for the user 101 in the form of a composite image 108, as illustrated in FIGS. 3-6. As discussed regarding FIG. 1A, the composite image 108 can include, but is not limited to, a virtual person image 107 of the user 101, and image data representing the user's geographic location, the user's activities, the weather and/or time of day at the user's geographic location, geographically relevant news information, etc. The processing server 104 broadcasts the composite image 108 to virtual environments via the Internet 106, providing viewers with encoded information about the physical context of the user 101.

Figure 2A:
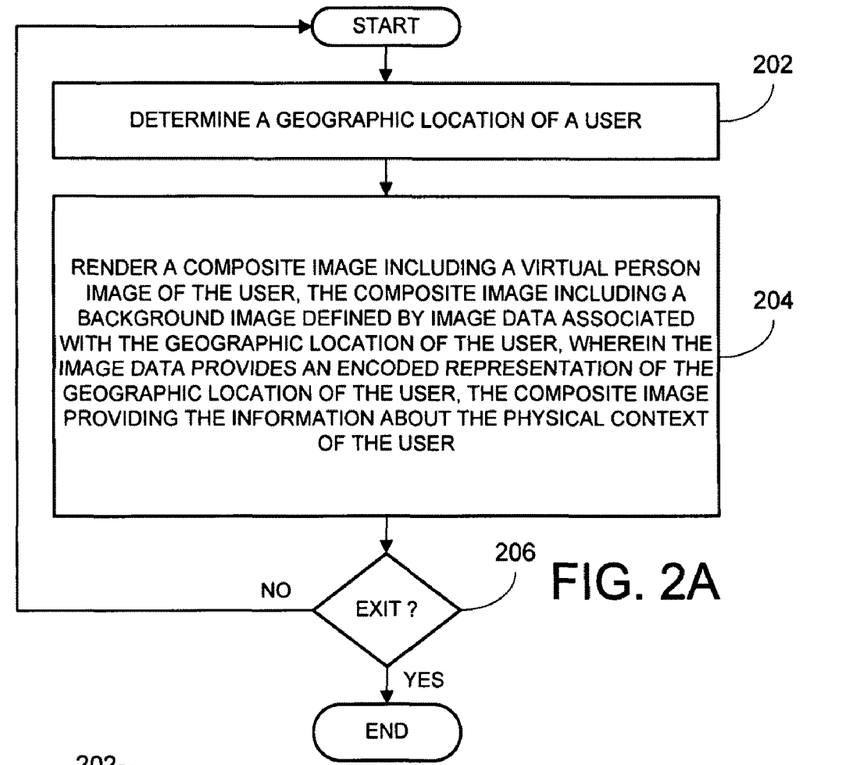
FIG. 2A is an illustration of a method for generating information about a physical context of a user, in accordance with an embodiment of the present invention.
Figure 2B:
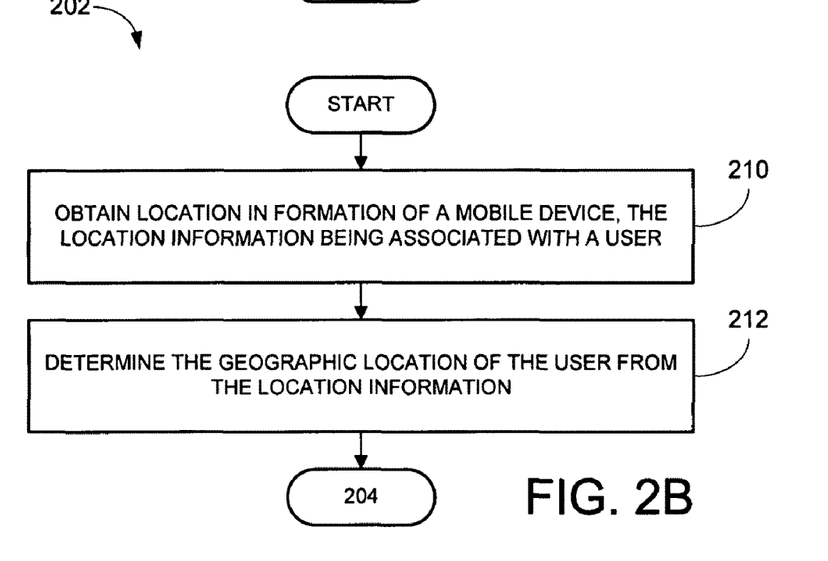
FIG. 2B is an illustration of a method for determining a geographic location of a user, in accordance with an embodiment of the present invention.

In FIG. 2A, is an illustration of a method for generating information about a physical context of a user 101, according to one embodiment of the present invention. The method begins at operation 202 where the context generation script 116 of the processing server 104 determines a geographic location of the user 101. More particularly, as shown in FIG. 2B, determining the geographic location of the user 101 at operation 202 includes obtaining location information of a mobile device 102. Specifically, at operation 210, the processing server 104 retrieves the location information of the mobile device 102 that is associated with the user 101 from the Internet 106. As shown in FIG. 1A above, according to one embodiment of the present invention, the location information can be uploaded to the Internet 106 from the mobile device 102 via the cellular communication system 110, when the mobile device 102 is a cellular phone. The location information can include a cell tower ID associated with the mobile device 102. In FIG. 1B above, according to another embodiment of the present invention, the location information can be uploaded to the Internet 106 by a GPS receiver module 118 of the mobile device 102 when the mobile device 102 is a GPS-capable device. In this case, the location information can include latitude and longitude GPS coordinates. In FIG. 1C above, according to yet another embodiment of the present invention, the location information can be uploaded to the Internet 106 by the mobile device 102 when the mobile device 102 is a computing device. In this case, the location information can include an Internet Protocol (IP) address or a Wireless Fidelity (WiFi) BSSID.

Referring still to FIG. 2B, determining the geographic location of the user 101 at operation 202 includes determining the geographic location of the user 101 from the location information retrieved at operation 210. Specifically, at operation 212, if the location information includes a cell tower ID, the processing server 104 passes the cell tower ID and user identifier information associated with the user 101 to the context generation script 116. In one embodiment of the present invention, the context generation script 116 can determine the geographic location of the user 101 by converting the cell tower ID into a city, state, or zip code corresponding to the geographic location of the cellular phone tower 112 where the user 101 is currently connected. For example, the Yahoo!™ ZoneTag™ Location API can be used to perform the conversion. It is important to note, however, that embodiments of the present invention are not limited to particular methods for performing the conversion.

Alternatively, at operation 212, if the location information retrieved by the processing server 104 includes GPS coordinates, the processing server 104 passes the GPS coordinates and user identifier information associated with the user 101 to the context generation script 116. The context generation script 116 can covert the GPS coordinates into a city, state, or zip code in any manner well known to one of ordinary skill in the art. Similarly, if the location information retrieved by the processing server 104 includes an IP address or WiFi BSSID, the processing server 104 passes the IP address or WiFi BSSID and user identifier information associated with the user 101 to the context generation script 116. As discussed above regarding FIG. 1, because the IP address and WiFi BSSID are each location specific, the context generation script 116 can convert the IP address or WiFi BSSID into a city, state, or zip code in any manner well known to one of ordinary skill in the art.

Referring again to FIG. 2A at operation 204, the composite image 108 is rendered to form the context avatar of the user 101 and provides information about the physical context of the user 101. Specifically, the composite image 108 rendered can include a virtual person image 107 of the user 101 and a background image 109 defined by image data associated with the geographic location of the user 101. The composite image 108 can also include image data representing the current weather conditions or time of day at the geographic location of the user 101, temporal data, activity data obtained from an electronic calendar system etc., news data, or any other data relevant to providing information about the physical context of the user 101. It is important to note that the composite image 108 can include any subset or combination of the information or data discussed above.

Figure 2C:
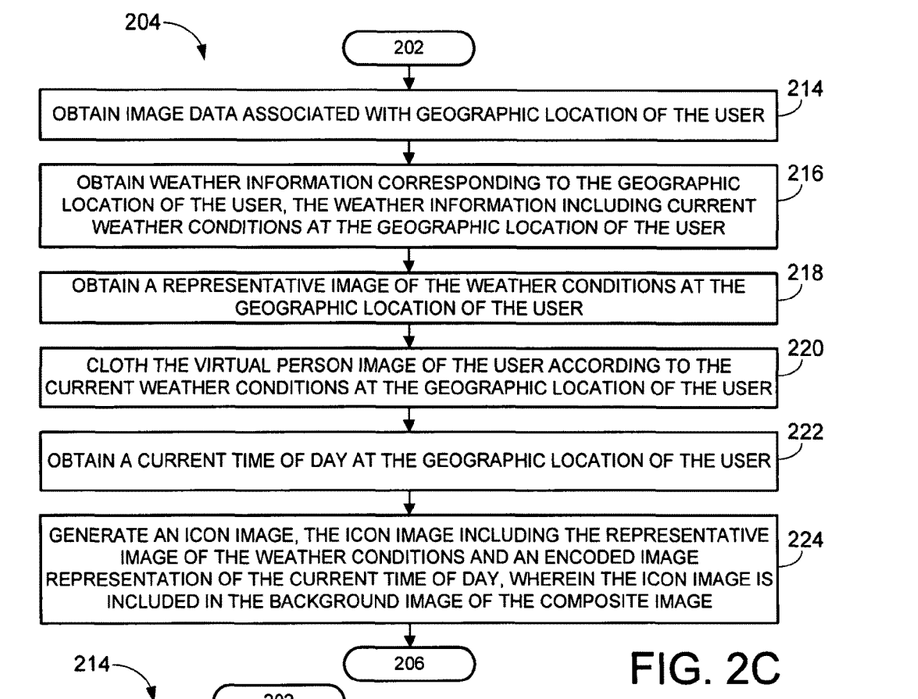
FIG. 2C is an illustration of a method for rendering a composite image that provides information about the physical context of a user, in accordance with an embodiment of the present invention.

Specifically, as shown in FIG. 2C, according to one embodiment of the present invention, rendering the composite image 108 at operation 204 can include, at operation 214, the context generation script 116 obtaining the image data associated with the geographic location of the user 101. The image data can be photographic image data, scanned images, digital artwork (e.g. cartoons, 3D renderings), news information images, map images, or any other image-based data.

Figure 2D:
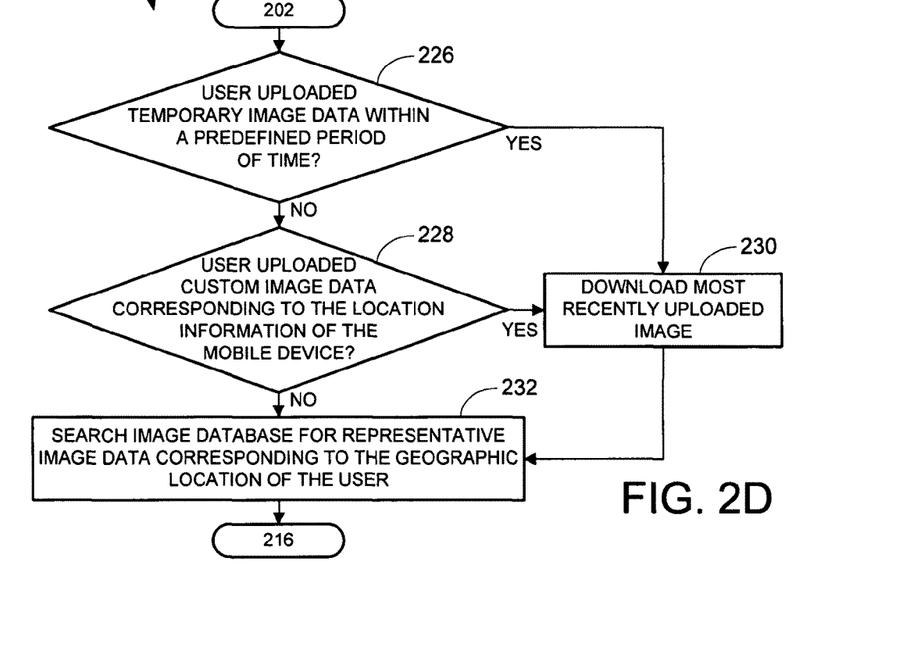
FIG. 2D is an illustration of a method for obtaining image data associated with a geographic location of a user, in accordance with an embodiment of the present invention.
Figure 3C:
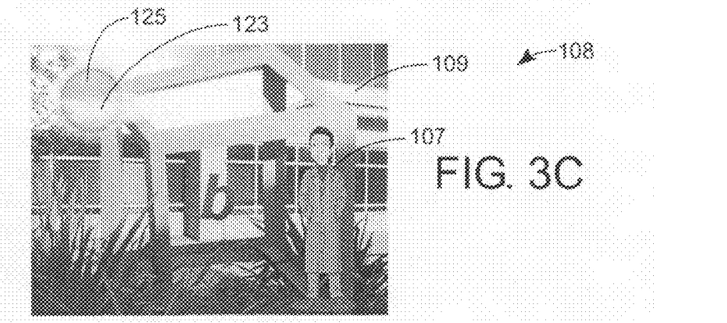
FIG. 3C is an illustration of a composite image including a background image that includes encoded temporary image data associated with a geographic location of a user, in accordance with an embodiment of the present invention.

To obtain image data, as shown in FIG. 2D at operation 226, the context generation script 116 can determine whether the user 101 has uploaded any temporary image data to the Internet 106 within a pre-defined time period. Temporary image data can be useful when the user 101 wishes to publicize their temporary presence at a particular event or location, as illustrated in FIG. 3C. Temporary image data can also be used to hide the geographic location of the user 101, for example, by utilizing image data to post a message (e.g. a photographic image of a sign or handwritten note). A client module 117 installed on the mobile device 102 or any other device associated with the user 101 can enable the user 101 to set temporary background images for their context avatar using temporary image data by uploading the temporary image data from the mobile device 102 to an image management system 103 coupled to the Internet 106. According to one embodiment of the present invention, the context generation script 116 can use the temporary image data as the background image 109 of the composite image 108 until the expiration of the pre-defined time period. The pre-defined time period can be set to any amount of time specified by the user 101, for example one-hour. In one embodiment of the present invention, the context generation script 116 can use the temporary image data irrespective of the actual geographic location of the user 101. For example, a ZoneTag™ client module 117 installed on the mobile device 102 can enable the user 101 to set temporary background images for their context avatar by uploading ZoneTag™ image data to an online photo management system 103 such as Flickr™ with a tag set to "setbadge." The "setbadge" tag designates the image data for temporary use during the pre-defined time period specified by the user 101. For additional information regarding the functionality of ZoneTag™ and Flickr™, reference can be made to: http://zonetag.research.yahoo.com and http://www.flickr.com. However, it is important to note that embodiments of the present invention are not limited to the use of particular applications or online image management systems 103 for providing temporary image data on the Internet 106. If temporary image data is available on the Internet 106 at operation 226, the method continues at operation 230. Otherwise, the method continues at operation 228.

Figure 3D:
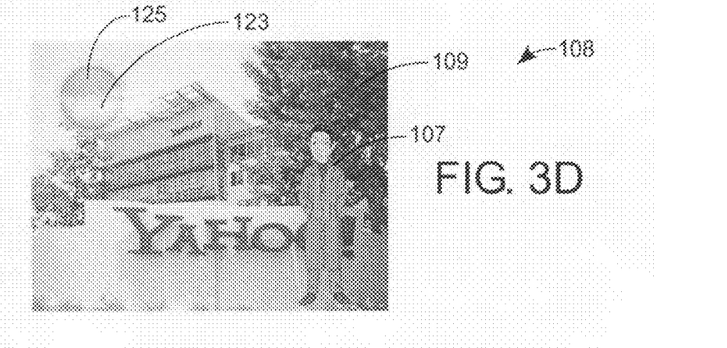
FIG. 3D is an illustration of a composite image including a background image that includes encoded custom image data associated with a geographic location of a user, in accordance with an embodiment of the present invention.

According to one embodiment of the present invention, at operation 228 of FIG. 2D, to obtain image data the context generation script 116 can also determine which of the uploaded image data corresponding to the location information of the mobile device 102 is tagged as custom image data. By tagging image data as custom image data, the user 101 can set a custom background image for a given geographic location so that each time the user 101 reenters the geographic location, the context generation script 116 will automatically use the most recently uploaded custom image data to define the background image of the user's context avatar, as shown in FIG. 3D. For example, the ZoneTag™ client module 117 installed on the mobile device 102 can enable the user 101 to set custom background images for his or her context avatar by uploading ZoneTag™ image data to an online photo management system 103 such as Flickr™ with a tag set to "setlocationbadge." The "setlocationbadge" tag designates the image data as custom image data that can be used by the context generation script 116 anytime the user 101 enters a particular geographic location. The user 101 can remove the custom image data tag by accessing the custom image data via the image management system 103. For example, custom image data can be removed by deleting the "setlocationbadge" tag of custom image data uploaded on Flickr™. As previously mentioned, for additional information regarding the functionality of ZoneTag™ and Flickr™ and other such online image management systems, reference can be made to: http://zonetag.research.yahoo.com and http://www.flickr.com. If custom image data is available on the Internet 106 at operation 228, the method continues at operation 230. Otherwise, the method continues at operation 232.

At operation 230, according to one embodiment of the present invention, the context generation script 116 downloads the image data identified at operation 226 or operation 228 from the image management system 103 via the Internet 106. Specifically, according to one embodiment of the present invention, the context generation script 116 selects the image data most recently uploaded or updated and downloads the selected image data. The method continues at operation 216.

Referring still to FIG. 2D, at operation 232, if the context generation script 116 has not identified image data uploaded by the user 101 at operations 226 and 228, the context generation script 116 can download the first results returned from a search of an image database 105. For example, the context generation script 116 can download the first results from a Yahoo!™ images search for a particular city name (e.g. San Francisco). As previously discussed, the image database 105 can be any database coupled to the processing server 104 or accessible to the processing server 104 via the Internet 106. The method continues at operation 216.

Referring again to FIG. 2C, at operation 216, the context generation script 116 can obtain weather information corresponding to the geographic location of the user 101, according to one embodiment of the present invention. For example, the context generation script 116 can utilize the Yahoo!™ Weather RSS feed API to get up-to-date weather information for a particular geographic location. However, it is important to note that embodiments of the present invention are not limited to a particular method of obtaining weather information for a geographic location. Therefore, context generation script 116 can obtain weather information in any manner well known to one of ordinary skill in the art. According to one embodiment of the present invention, the weather information can include current weather conditions at the geographic location of the user 101, including, but not limited to, conditions such as: rain, freezing rain, lightning, snow, wind, overcast, sunny, partly sunny, mostly sunny, or temperature.

Figure 4A:
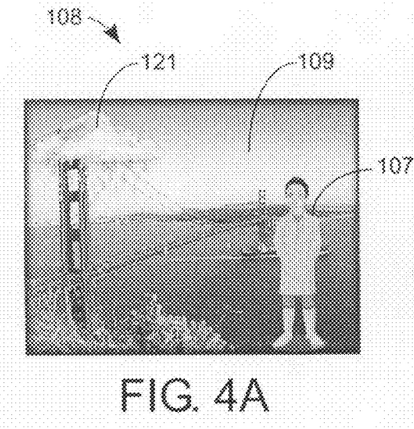
FIG. 4A is an illustration of a composite image including a virtual person image having clothing encoded with rain weather conditions at the geographic location of the user, and including an image representing rain weather conditions at the geographic location of the user, in accordance with an embodiment of the present invention.
Figure 4B:
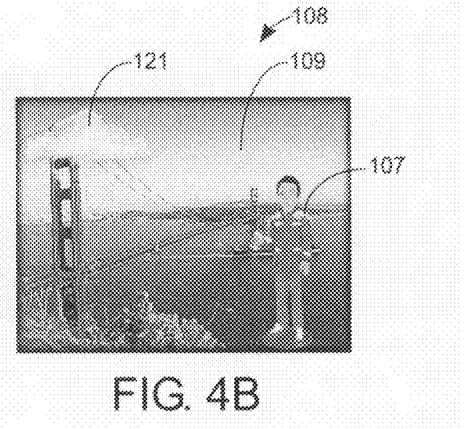
FIG. 4B is an illustration of a composite image including a virtual person image having clothing encoded with snow weather conditions at the geographic location of the user, and including an image representing snow weather conditions at the geographic location of the user, in accordance with an embodiment of the present invention.

At operation 218, in one embodiment of the present invention, the context generation script 116 can obtain an image 123 that represents the current weather conditions at the geographic location of the user 101. For example, FIG. 4A illustrates an image 123 showing rain conditions at the geographic location of the user 101. Likewise, FIG. 4B illustrates an image 123 showing snow conditions at the geographic location of the user 101. As discussed below at operation 224, the encoded image 123 of the weather conditions can be included in an icon image 121 that is included in the background image 109 of the composite image 108 that forms the user's context avatar.

At operation 220, in one embodiment of the present invention, the context generation script 116 can automatically clothe the virtual person image 107 of the user 101 according to the current weather conditions at the geographic location of the user 101. For example, FIGS. 6A-6F respectively illustrate the virtual person image 107 of the user 101 clothed at temperatures below 50° F., between 50° and 60° F., between 60° and 70° F., between 70° and 80° F., between 80° and 100° F., and over 100° F. In other words, according to one embodiment of the present invention, the clothing worn by the virtual person image 107 can vary based on the current temperature at the user's geographic location. As the temperature increases, the context generation script 116 can automatically clothe the virtual person image 107 in lighter clothing. Conversely, as the temperature decreases, the context generation script 116 can automatically clothe the virtual person image 107 in heavier clothing. In another embodiment of the present invention, the virtual person image 107 can be clothed based on other context-based parameters including, but not limited to, the user's geographic location or current activity. For example, the virtual person image 107 can be clothed in a lei or ski gear to reflect that currently the user 101 is located in Hawaii or Aspen. Likewise, for example, the virtual person image 107 can be clothed in a tuxedo or wedding dress to reflect that the user 101 is currently attending a wedding.

Referring still to FIG. 2C, at operation 222, according to one embodiment of the present invention, the context generation script 116 can obtain a current time of day at the geographic location of the user 101. According to embodiments of the present invention, the context generation script 116 can obtain the current time of day in any manner well known to one of ordinary skill in the art.

Figures 5, 6A:
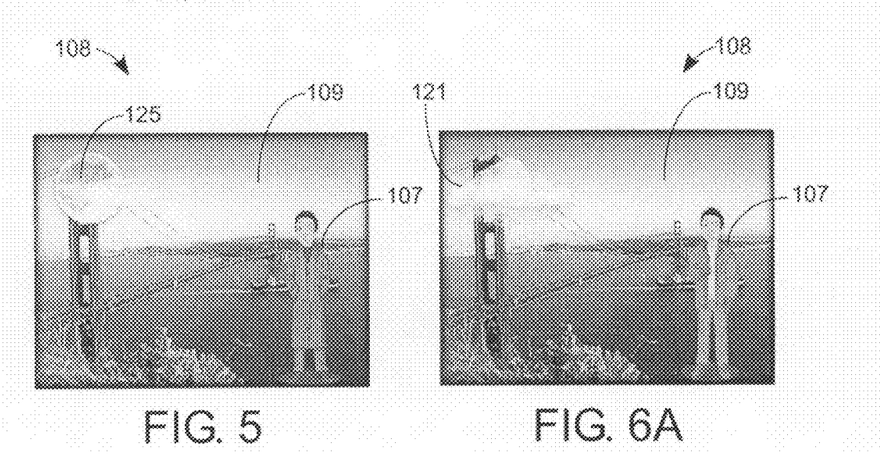
FIG. 5 is an illustration of a composite image including an encoded image representing the current time of day at the geographic location of the user as being between sunset and sunrise, in accordance with an embodiment of the present invention.
FIG. 6A is an illustration of a composite image including a virtual person image clothed according to a current temperature less than 50° F. at the geographic location of the user, in accordance with an embodiment of the present invention.
Figure 6B:
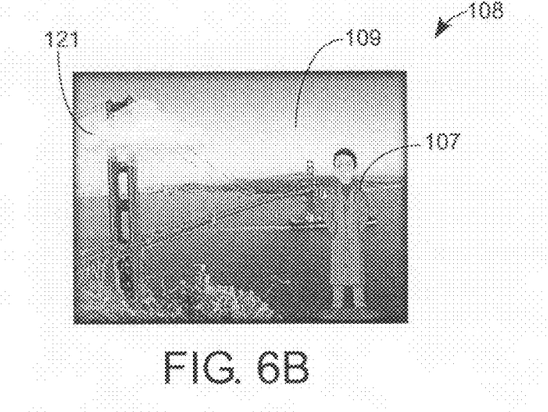
FIG. 6B is an illustration of a composite image including a virtual person image clothed according to a current temperature between 50° F. and 60° F. at the geographic location of the user, in accordance with an embodiment of the present invention.
Figure 6C:
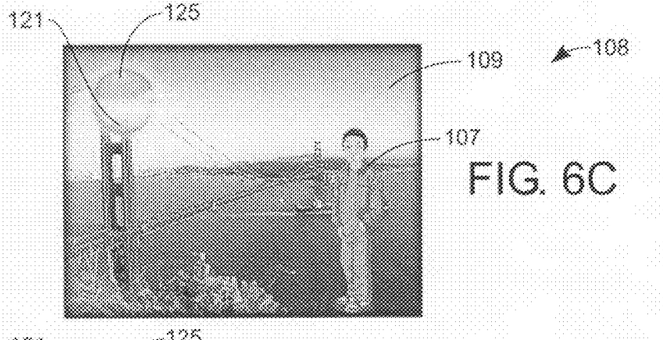
FIG. 6C is an illustration of a composite image including a virtual person image clothed according to a current temperature between 60° F. and 70° F. at the geographic location of the user, in accordance with an embodiment of the present invention.
Figure 6D:
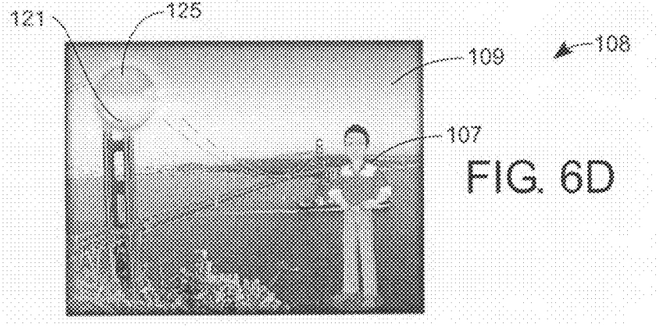
FIG. 6D is an illustration of a composite image including a virtual person image clothed according to a current temperature between 70° F. and 80° F. at the geographic location of the user, in accordance with an embodiment of the present invention.
Figure 6E:
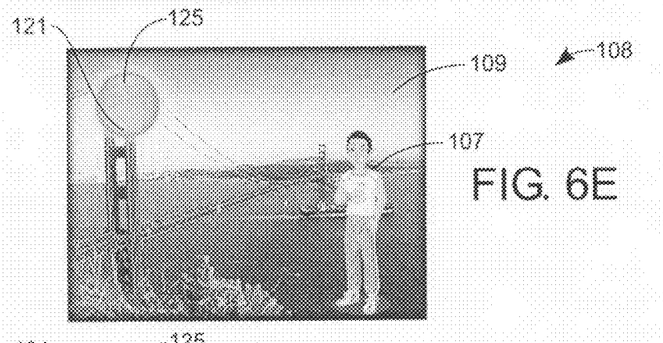
FIG. 6E is an illustration of a composite image including a virtual person image clothed according to a current temperature between 80° F. and 100° F. at the geographic location of the user, in accordance with an embodiment of the present invention.
Figure 6F:
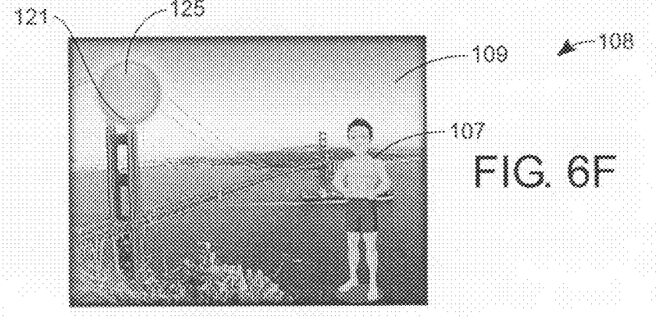
FIG. 6F is an illustration of a composite image including a virtual person image clothed according to a current temperature greater than 100° F. at the geographic location of the user, in accordance with an embodiment of the present invention.

At operation 224, according to one embodiment of the present invention, the context generation script 116 can generate an icon image 121 that includes an image 123 representing the weather conditions and/or an image 125 representing the current time of day at the geographic location of the user 101. In one embodiment of the present invention, the image representation 125 of the current time of day can be encoded as a sun image if the current time of day is between sunrise and sunset, as illustrated in FIGS. 3A-3D and FIGS. 6C-6F. Likewise, the image representation 125 of the current time of day can be encoded as a moon image if the current time of day is between sunset and sunrise, as illustrated in FIG. 5. According to one embodiment of the present invention, the icon image 121 can be included in the background image 109 of the composite image 108, as illustrated in FIGS. 3-6. By utilizing images to represent weather conditions and time of day etc. at the geographic location of the user 101 rather than providing the information explicitly, the user 101 can disseminate information to one or more viewers with some guarantee that only those viewers having shared context with the user 101 can decode the user's context avatar.

Referring again to FIG. 2A, at operation 204, the context generation script 116 can render the composite image 108 including the virtual person image 107 of the user 101, the background image defined by the image data associated with the geographic location of the user 101. As discussed above, the composite image 108 can also be encoded with information about the weather conditions and/or time of day etc. at the geographic location of the user 101. Also, according to an alternate embodiment of the present invention, the composite image can include one or more virtual person images, each corresponding to a third party user that is acting within or sharing the physical context of the user 101. For example, in one embodiment of the present invention, the user 101 can explicitly enable the inclusion of third party users who are also configured to disclose their geographic location to the processing server 104. This can be done by utilizing utilities provided by the virtual environment (e.g. context avatar website) hosting the user's context avatar 108. In one embodiment, the context generation script 116 can detect that an enabled third party user is in the same geographic location as the user 101 and, as a result, make an assumption that the user 101 and the third party user are acting together. The context generation script 116 can then automatically add the virtual person image 107 associated with the third party user to the composite image 108 of the user 101. This allows the user 101 to communicate a social component of their physical context. However, viewers of the composite image 108 would need to have some shared context with the user 101 or the third party to recognize their respective virtual person images 107. In another embodiment, the context generation script 116 can automatically add a third party user to the composite image 108 of the user 101 when the third party user is identified by the context generation script 116 as being part of a social network of the user 101.

Once the composite image 108 forming the user's context avatar is created by the context generation script 116, the processing server 104 can broadcast the composite image 108 to viewers interested in obtaining information about the physical context of the user 101. In one embodiment of the present invention, broadcasting the composite image 108 can include publishing the composite image 108 on a webpage or in any other virtual environment.

Referring still to FIG. 2A, according to one embodiment of the present invention, the processing server 104 can automatically perform operations 202-206 (and any intervening operations) without intervention by the user 101 once every pre-defined time interval or each time the processing server 104 receives notification that the geographic location of the user 101 has changed. By automatically changing the context avatar of the user 101 based on the user's physical context, the context avatar can always reflect an accurate representation of the user's current status. For example, where the mobile device 102 hosts a ZoneTag™ client module 117, the processing server 104 can perform operations 202-206 (and any intervening operations) each time the ZoneTag™ client module 117 asks the processing server 104 for suggested tags. Specifically, the ZoneTag™ client module can ask the processing server 104 for suggested tags once every 10 minutes or each time the mobile device 102 connects to a different cellular phone tower 112, whichever is shorter.

Figure 7A:
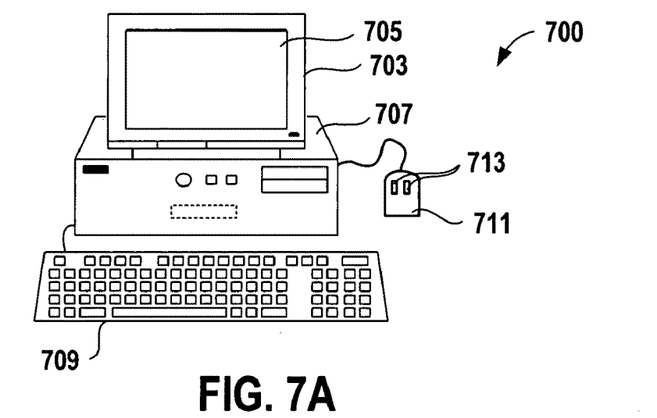
FIG. 7A is a generalized diagram of a typical computer system suitable for use with the present invention.

In FIG. 7A, is an illustration of an embodiment of an exemplary computer system 700 suitable for use with the present invention including display 703 having display screen 705. Cabinet 707 houses standard computer components (not shown) such as a disk drive, CDROM drive, display adapter, network card, random access memory (RAM), central processing unit (CPU), and other components, subsystems and devices. User input devices such as a mouse 711 having buttons 713, and keyboard 709 are shown.

Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 7B:
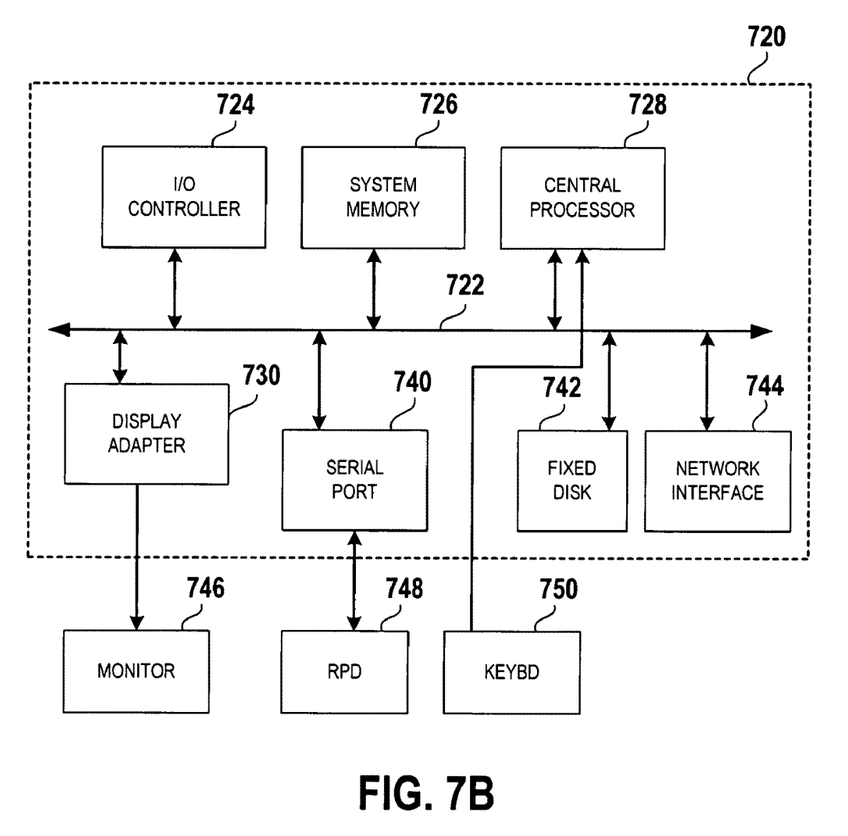
FIG. 7B shows subsystems in the typical computer system of FIG. 7A.

FIG. 7B illustrates subsystems that might typically be found in a computer such as computer 700. In FIG. 7B, subsystems within box 720 are directly interfaced to internal bus 722. Such subsystems typically are contained within the computer system such as within cabinet 707 of FIG. 7A. Subsystems include input/output (I/O) controller 724, System Random Access Memory 9RAM) 726, Central Processing Unit (CPU) 728, Display Adapter 730, Serial Port 740, Fixed Disk 742 and Network Interface Adapter 744. The use of bus 722 allows each of the subsystems to transfer data among the subsystems and, most importantly, with the CPU. External devices can communicate with the CPU or other subsystems via the bus 722 by interfacing with a subsystem on the bus. Monitor 746 connects to the bus through Display Adapter 730. A relative pointing device (RPD) 748 such as a mouse connects through Serial Port 740. Some devices such as a Keyboard 750 can communicate with the CPU by direct means without using the main data bus as, for example, via an interrupt controller and associated registers (not shown).

As with the external physical configuration shown in FIG. 7A, many subsystem configurations are possible. FIG. 7B is illustrative of but one suitable configuration. Subsystems, components or devices other than those shown in FIG. 7B can be added. A suitable computer system can be achieved without using all of the subsystems shown in FIG. 7B. For example, a standalone computer need not be coupled to a network so Network Interface 744 would not be required. Other subsystems such as a CDROM drive, graphics accelerator, etc. can be included in the configuration without affecting the performance of the system of the present invention.

Figure 7C:
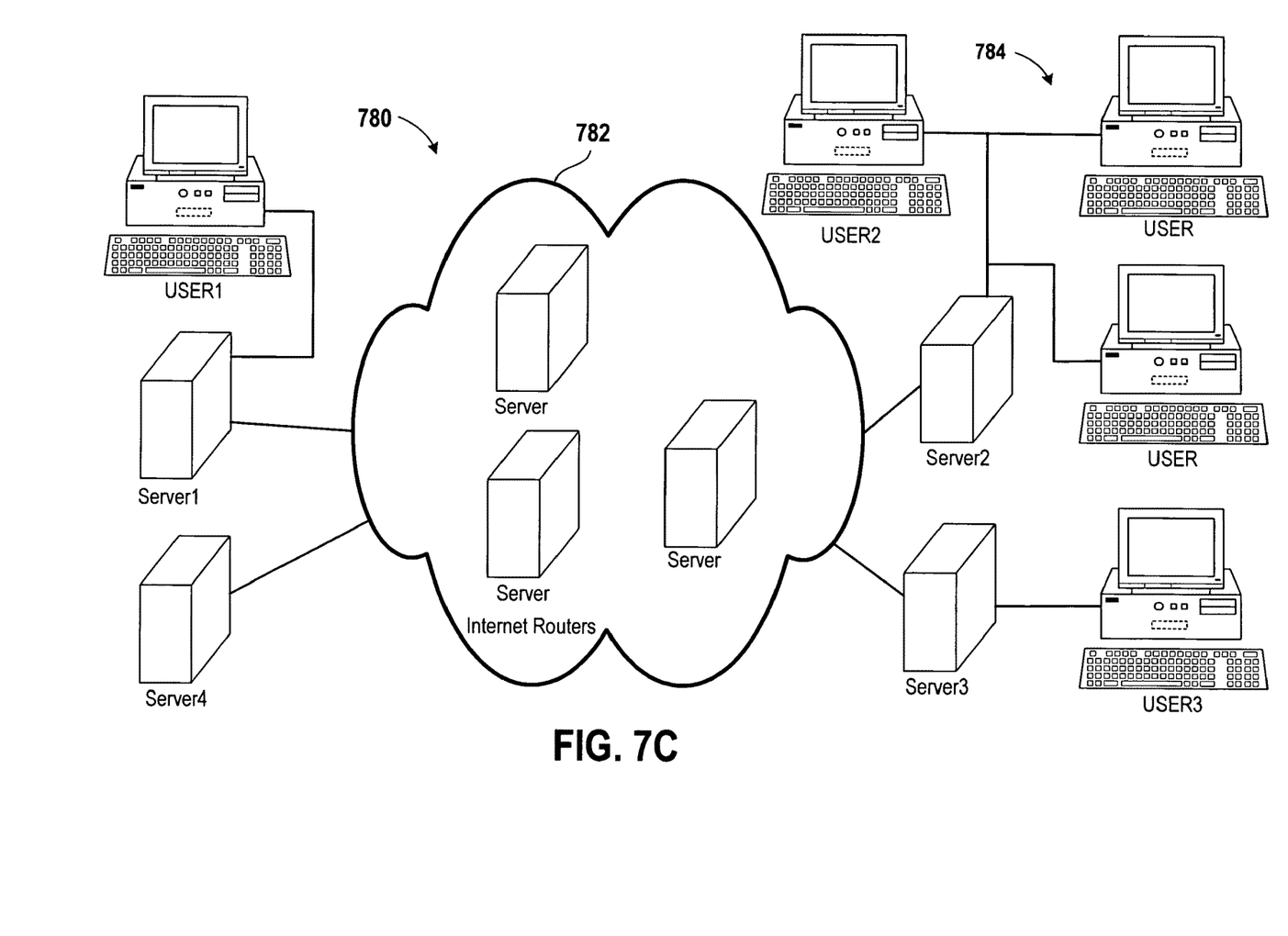
FIG. 7C is a generalized diagram of a typical network suitable for use with the present invention.

FIG. 7C is a generalized diagram of a typical network. In FIG. 7C, the network system 780 includes several local networks coupled to the Internet. Although specific network protocols, physical layers, topologies, and other network properties are presented herein, embodiments of the present invention are suitable for use with any network.

In FIG. 7C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of sever routers 782. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 784 are shown utilizing a local network at a different location from USER1 computer. The computers at 784 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically though of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any medium/media that can contain, store, communicate, propagate, or transport the computer program for use by or in connection with the instruction execution system, apparatus, system or device. The computer readable medium can be, by way of example only but not by limitation, an electronic, magnetic, optical, or semiconductor system, apparatus, system, device, or computer memory. The computer readable medium may have suitable instructions for synchronously presenting multiple video program ID streams, such as on a display screen, or for providing for input or presenting in accordance with various embodiments of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claim.

What is claimed is:

1. A method for displaying information about a physical context of a user, comprising:
   (a) obtaining information about the physical context of the user;
   (b) generating an encoded representation of the physical context based on the information by adding information related to the physical context at the present time;
   (c) creating a composite image including a virtual person image of the user and the encoded representation, the composite image being created upon obtaining the physical context of the user to represent the physical context of the user at a present time; and
   (d) displaying the composite image,
   wherein (a)-(c) are performed without intervention by the user.

2. The method as recited in claim 1, further including:
   performing (a)-(d) every pre-defined time interval or upon receipt of a notification that the physical context of the user has changed, wherein the pre-defined time interval is set by the user.

3. The method as recited in claim 1, wherein displaying the composite image includes broadcasting the composite image to one or more viewers interested in obtaining the information about the physical context of the user, and wherein broadcasting the composite image further includes publishing the composite image on a webpage.

4. The method as recited in claim 1, wherein the composite image includes additional virtual person images, wherein each of the additional virtual person images corresponds to a third party user acting within the physical context of the user.

5. The method as recited in claim 1, further including:
   determining a geographic location of the user at the present time based on location information of a mobile device; and
   selecting a background image associated with the geographic location, wherein the encoded representation includes the background image.

6. The method as recited in claim 5, wherein selecting the background image further includes:
   determining a most recent image from a plurality of images associated with the geographic location; and
   downloading the most recent image to use as the background image.

7. The method as recited in claim 1, wherein obtaining the information about the physical context of the user includes one or more of:
   determining a geographic location of the user at the present time from location information of a mobile device, the location information being associated with the user; and
   determining activity of the user at the present time from an electronic calendar system.

8. The method as recited in claim 7, wherein the virtual person image of the user is clothed according to the geographic location of the user at the present time.

9. The method as recited in claim 7, wherein determining the geographic location of the user includes one of:
   retrieving the location information of the mobile device and user identifier information associated with the mobile device from the mobile device, if the mobile device is a cellular phone, the location information including a cell tower ID;
   retrieving the location information of the mobile device and user identifier information associated with the mobile device from the mobile device, if the mobile device is the Global Positioning System (GPS)-capable device, the location information including GPS coordinates; or
   retrieving the location information of the mobile device and user identifier information associated with the mobile device from the mobile device, if the mobile device is a computing device, the location information including an Internet Protocol (IP) address or a WiFi (Wireless Fidelity) BSSID (Basic Service Set ID).

10. The method as recited in claim 9, wherein the cell tower ID is associated with the cellular phone and a cellular phone tower of a cellular communication system.

11. The method as recited in claim 9, wherein the GPS coordinates include a latitude and longitude.

12. The method as recited in claim 7, wherein generating the encoded representation further includes one or more of:
   adding weather information corresponding to the geographic location of the user, the weather information representing weather conditions at the geographic location of the user at the present time; and
   adding time of day information corresponding to the geographic location of the user at the present time.

13. The method as recited in claim 12, wherein the virtual person image of the user is clothed according to the current weather conditions.

14. The method as recited in claim 12, wherein the current weather conditions include one or more of: rain, freezing rain, lightning, snow, wind, overcast, sunny, partly sunny, mostly sunny, and temperature.

15. The method as recited in claim 7, wherein the encoded representation further includes an icon image, the icon image including one or more of:
   an image representing current time of day at the geographic location of the user at the present time; and
   an image representing current weather conditions at the geographic location of the user at the present time.

16. The method as recited in claim 15,
   wherein the image representing current time of day at the geographic location of the user is a sun image, if the current time of day is between sunrise and sunset, and wherein the image representing current time of day at the geographic location of the user is a moon image, if the current time of day is between sunset and sunrise.

17. The method as recited in claim 7, wherein generating the encoded representation includes providing a background image defined by image data associated with a city where the user is located at the present time.

18. The method as recited in claim 17, wherein providing the background image includes obtaining the image data associated with the geographic location of the user by one of:
   searching an image database for representative image data corresponding to the geographic location of the user;
   downloading a custom image from the Internet; or
   downloading a temporary image from the Internet.

19. The method as recited in claim 18, wherein the custom image is a ZoneTag™ image having a "setlocationbadge" tag.

20. The method as recited in claim 19, wherein downloading the custom image includes:
   (i) identifying one or more uploaded images tagged as custom image data;
   (ii) identifying which of the one or more uploaded images identified at (i) are associated with the location information of the mobile device; and
   (iii) selecting the custom image to download from the one or more uploaded images identified at (ii), wherein the custom image selected to download is a most recently uploaded custom image.

21. The method as recited in claim 18, wherein the temporary image is a ZoneTag™ image having a "setbadge" tag.

22. The method as recited in claim 21, wherein downloading the temporary image further includes:
   (i) identifying one or more uploaded images tagged as temporary image data;
   (ii) identifying which of the one or more uploaded images identified at (i) were uploaded within a pre-defined time period; and
   (iii) selecting the temporary image to download from the one or more uploaded images identified at (ii), wherein the temporary image selected to download is a most recently uploaded temporary image.

23. A computer-readable media for directing a computer system to generate information about a physical context of a user, comprising:
   instructions for obtaining information about the physical context of the user;
   instructions for generating an encoded representation of the physical context based on the information by adding information related to the physical context at the present time;
   instructions for creating a composite image including a virtual person image of the and the encoded representation, the composite image being created upon obtaining the physical context of the user to represent the physical context of the user at a present time; and
   instructions for displaying the composite image.

24. A system for generating information about a physical context of a user, comprising:
   a mobile device coupled to the Internet, the mobile device being capable of providing location information of the mobile device and user identifier information associated with the mobile device; and
   a processing server coupled to the Internet, wherein the processing server is capable of:
      obtaining information about the physical context of the user from the Internet, including the location information of the mobile device and the user identifier information, the location information and the user identifier information being used to determine a geographic location of the user;
      generating an encoded representation of the physical context based on the information by adding information related to the geographic location of the context at the present time; and
      generating a composite image including a virtual person image of the user and the encoded representation, the composite image being created upon obtaining the physical context of the user to represent the physical context of the user at a present time.

25. The system as recited in claim 24, further comprising a cellular communication system coupled between the mobile device and the Internet,
   wherein the mobile device is a cellular phone,
   the mobile device being capable of obtaining the location information of the cellular phone from the cellular communication system, the location information including a cell tower ID, and
   the mobile device being capable of providing the location information and the user identifier information associated with the cellular phone on the Internet via the cellular communication system.

26. The system as recited in claim 24, further comprising a satellite communication system coupled between the mobile device and the Internet,
   wherein the mobile device is a GPS-capable mobile device,
   the mobile device being capable of obtaining the location information of the GPS-capable mobile device from the satellite communication system, the location information including GPS coordinates, and
   the mobile device being capable of providing the location information and the user identifier information associated with the GPS-capable mobile device on the Internet via the satellite communication system.

27. The system as recited in claim 24,
   wherein the mobile device is a computing device, and
   wherein the location information includes an Internet Protocol (IP) address or a WiFi (Wireless Fidelity) BSSID (Basic Service Set ID).

* * * * *